(12) United States Patent
Reitinger et al.

(10) Patent No.: US 11,782,419 B2
(45) Date of Patent: Oct. 10, 2023

(54) METHOD FOR AUTOMATICALLY GENERATING A BEHAVIOR TREE PROGRAM FOR CONTROLLING A MACHINE

(71) Applicant: Siemens Aktiengesellschaft, Munich (DE)

(72) Inventors: Axel Reitinger, Munich (DE); Markus Michael Geipel, Munich (DE); Johannes Kehrer, Munich (DE); Ferdinand Strixner, Munich (DE); Dieter Bogdoll, Munich (DE)

(73) Assignee: SIEMENS AKTIENGESELLSCHAFT

( * ) Notice: Subject to any disclaimer, the term of this patent is extended or adjusted under 35 U.S.C. 154(b) by 0 days.

(21) Appl. No.: 17/724,731

(22) Filed: Apr. 20, 2022

(65) Prior Publication Data
US 2022/0350308 A1 Nov. 3, 2022

(30) Foreign Application Priority Data
Apr. 30, 2021 (EP) .................................... 21171641

(51) Int. Cl.
*G05B 19/4155* (2006.01)
(52) U.S. Cl.
CPC ............... *G05B 19/4155* (2013.01); *G05B 2219/33051* (2013.01)
(58) Field of Classification Search
None
See application file for complete search history.

(56) References Cited

U.S. PATENT DOCUMENTS

| 2019/0086894 A1* | 3/2019 | Tenorth | G05B 19/042 |
| 2022/0035339 A1* | 2/2022 | Saunders | G06N 3/008 |
| 2022/0244708 A1* | 8/2022 | Gemignani | B25J 9/1602 |

FOREIGN PATENT DOCUMENTS

SE 2150130 A1 2/2021

OTHER PUBLICATIONS

French, Kevin et al: "Learning Behavior Trees From Demonstration"; 2019 International Conference on Robotics and Automation (ICRA), IEEE; May 20, 2019 (May 20, 2019), pp. 7791-7797, XP033594088.

* cited by examiner

*Primary Examiner* — Ryan A Jarrett
(74) *Attorney, Agent, or Firm* — Schmeiser, Olsen & Watts LLP

(57) ABSTRACT

A computer implemented method for automatically generating a behavior tree program for controlling a machine includes the steps of: transmitting a sequence of machine commands input by a user from a user interface to a controller, receiving supervision data in the user interface from the controller while the machine commands are executed in the controller controlling the machine, observing and copying the machine commands and supervision data transmitted between the controller and the user interface, storing the machine commands and the supervision data in a logging unit, generating a behavior tree program derived from the stored machine commands and the supervision data by statistical inference, and sending the generated behavior tree program to the controller unit to control the machine.

17 Claims, 4 Drawing Sheets

Figure 1:
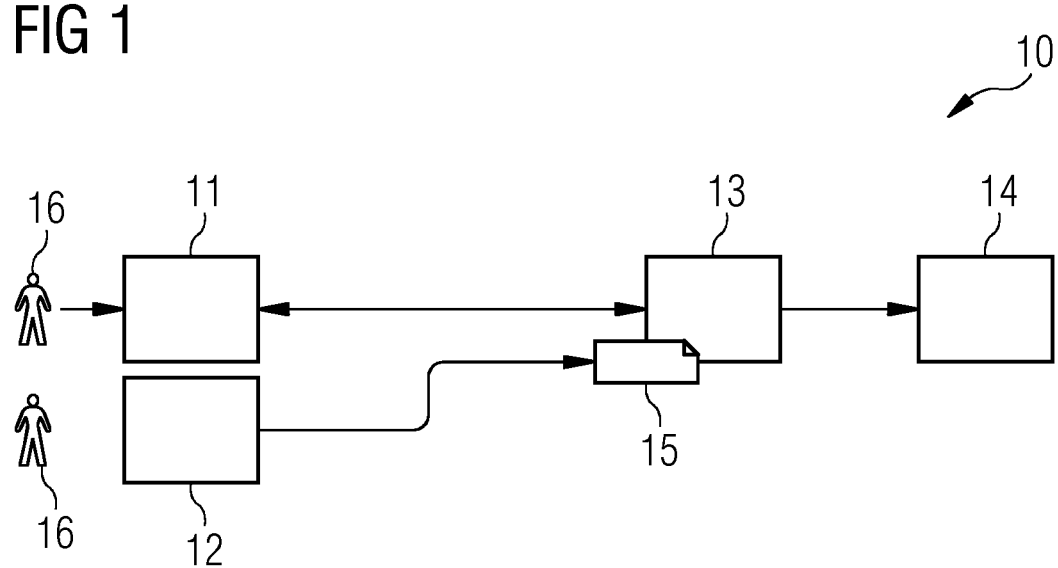

METHOD FOR AUTOMATICALLY GENERATING A BEHAVIOR TREE PROGRAM FOR CONTROLLING A MACHINE

CROSS-REFERENCE TO RELATED APPLICATIONS

This application claims priority to EP Application No. 21171641.0, having a filing date of Apr. 30, 2021, the entire contents of which are hereby incorporated by reference.

FIELD OF TECHNOLOGY

The following relates to computer implemented method for automatically generating a behavior tree program for controlling a machine, e.g., in an industrial automation system and an assistant apparatus configured to perform the method.

BACKGROUND

In various technical fields, there is a need to control a machine or a system of machine. For example, in the industrial automation context autonomous machines gain more and more of importance. There are continuous efforts made in the process and manufacturing industry to efficiently implement a lot size one production based on factories equipped with modular and autonomous machines acting on the shop floor. At the same time, modular and in particular autonomous machines are hard to program and coordinate.

In the case of structured text, programming languages of the IEC 61131 standard for programmable logic controller, short PLC, follow the imperative programming paradigm. They define the behavior of a concrete machine as a rigid sequence with explicit decision points. In the case of function block diagrams, a logical circuit is emulated. This is a good fit for the classical factory where precisely defined repetitive movements are desired, reactions depend on simple, often binary sensor input and the machine has a limited number of states, like for example running, idle, off, etc.

Behavior trees are a powerful programming paradigm to overcome the limitations of classical PLC programming approaches. A behavior tree describes switchings between a finite set of tasks in a modular fashion. Their strength results from their ability to create very complex tasks composed of simple tasks, without worrying how the simple tasks are implemented. A task describes single behavior steps, several tasks are combined into compositions defining in which order and under which condition the single tasks shall be executed. Behavior trees present some similarities to hierarchical state machines with the key difference that the main building block of a behavior is a task rather than a state. Its ease of human understanding make behavior trees less error prone. The expression behavior tree and behavior tree program are used as synonyms throughout this document.

Nowadays, behavior trees are manually created and entered to a controller of the machine or system of machine by automation engineers. While behavior trees are easier to handle than classical PLC programming languages, they still need some amount on training for the automation engineer.

SUMMARY

Therefore, an aspect relates to support the automation engineer in generating of a behavior tree.

According to a first aspect, a computer-implemented method for automatically generating a behavior tree program for controlling a machine is proposed, the method comprising the steps of
 transmitting a sequence of machine commands input by a user from a user interface to a controller,
 receiving supervision data in the user interface from the controller while the machine commands are executed in the controller controlling the machine,
 observing and copying the machine commands and supervision data transmitted between the controller and the user interface,
 storing the machine commands and the supervision data in a logging unit,
 generating a behavior tree program derived from the stored machine commands and the supervision data by statistical inference, and
 sending the generated behavior tree program to the controller unit to control the machine.

Machine commands are entered by the user to control the machine. The machine command is executed in the controller and invokes one or several extensive closed program sections executing an action of the machine or an action of a component of the machine. Machine commands are structured according to, e.g., programming languages of the IEC 61131 standard. Instead of programing the behavior tree, the behavior tree is automatically generated based on the interaction of the user with the machine. The user's intention with respect to the operation of the machine, which is not available explicitly, gathered without asking the user directly but by observation, prediction and extrapolation of the user behavior. Statistical inference is a process of using data analysis to infer properties of an underlying distribution of probability. The structure of the behavior tree is derived using statistical inference. Methods applied for statistical inference can be, e.g., association rule mining, an apriori algorithm, or methods for sequential pattern mining. The machine command is transmitted in a communication connection between the user interface and the controller via a communication protocol, e.g. OPC UA, Profinet.

According to an embodiment of the invention, the machine command activates a machine behavior, a functionality or an operational state in the machine.

Machine commands define the machine behavior, the functionality or an operational state on different level of details from high level describing a complete action to low level comprising very precise and detailed components of an action. This allows a detailed analysis considering the substructures of the machine commands and enables a prediction of the structure of the behavior tree close to the user's intended machine operation. In this description the expressions "machine command" and "high-level machine command" are used as synonyms.

According to an embodiment of the invention, the supervision data comprises status information and/or sensor data of the machine when controlled by the controller executing the high-level machine commands.

Status information comprise information whether the execution of the machine command and/or the action activated by the machine command was executed successfully of failed. Status information comprises also senor data values collected by sensors in the machine or in components of the machine providing information on the condition of the machine or conditions of the performed automation process. The supervision data can be provided independent of the execution of a machine command. Therefore, the status information provides a comprehensive overview on the operation of the machine.

According to an embodiment of the invention, at least one task of the behavior tree is derived from at least one machine command at the inference unit.

Tasks provide the basic components of a behavior tree and when executed preform an action of the machine. The inference unit provides the basic components of behavior tree and therefore generates the behavior tree from scratch, i.e., without any input of programming elements of the behavior tree.

According to an embodiment of the invention, the structure of the behavior tree is inferred by analyzing
- which of the derived tasks are executed in which temporal relation to each other,
- the return value of the supervision data,
- the parameter settings for the task with respect to the execution of the task,
- the co-occurrence of supervision data values and changes of supervision data value with task execution, task cancellations and task parametrizations.

The inference unit derives by the described analyzing steps further structure of the behavior tree, especially composites and decorators defining rules with respect to condition and sequence the tasks are executed. Especially a decorator is inferred by analyzing the co-occurrence of supervision data values and changes of supervision data value with task execution, task cancellations and task parametrizations. Co-occurrence means analyzing which supervision data values or value chances occur at the same time as or timely related to the execution of one or several tasks or the cancellation of one or several tasks or the parameter settings of the task.

According to an embodiment of the invention, a composite combining several tasks of the behavior tree, is inferred by analyzing a sequence of successfully performed tasks and failed tasks and a transition probability for each pair of tasks in the sequence.

According to an embodiment of the invention, the inference unit provides suggestions for further machine commands to the user interface to be entered by the user.

This supports the user to automate machine operation. The user requires less knowledge of the machine command programming of the machine. Suggestions of the inference unit can be checked and reviewed and can used to train the inference unit continuously.

According to an embodiment of the invention, the inference unit provides a suggestion for a further behavior tree structure element to the user interface to be entered by the user.

The structure of the behavior tree comprises at least on structure element, the structure element comprises a composition of behavior tree components. Behavior tree components are, e.g., tasks, composites, and decorators. The suggestion assists the user to improve in programming the behavior tree and improves the quality of the resulting behavior tree.

According to an embodiment of the invention, the inference unit comprises a semantic model providing domain knowledge on at least one of a sequence of tasks, conditions of the tasks and a transition probability for each pair of tasks in the sequence related to a specific machine operation scenario.

The semantic model comprises a collection of behavior tree components related to specific machine operation scenarios, wherein the behavior tree components define typical sequences of tasks and conditions under which the tasks shall be executed. The semantic model can provide information about tasks that can fail, and which fallback solutions are possible in this case. This accelerates the generation of the behavior tree for a new operation scenario and the generation of variants of the operation scenario. It further allows the inference unit to provide extensive suggestions According to an embodiment of the invention, the inference unit provides a recommendation for the behavior tree structure element to the user interface based on an assumption with respect to a further intended machine operation for verification or modification of the recommendation.

This provides the inference unit the possibility to receive instant feedback of the user and early alignment of the behavior tree program with the machine operation intended by the user According to an embodiment of the invention, the generated behavior tree program is provided from the inferring unit to the controller for controlling the machine.

The generated behavior tree program can be provided directly from the inferring unit to the controller or the generated behavior tree program can be transferred from the inferring unit to the user interface which forwards it from the user interface to the controller when an acknowledgement of the user is received. The direct provision allows a fast implementation of the behavior tree. The indirect provision via user interface allows the user to approve, correct or prohibit the implementation, i.e., the execution of the automatically generated behavior tree in the controller.

According to a second aspect, an assistance system for assisted generating a behavior tree program for a machine is proposed, comprising a programming interface, an observer unit, a logging unit and an inference unit, wherein
- the interface unit is configured to transmit a sequence of machine commands input by a user from the user interface to a controller, and to receive supervision data from the controller while the machine commands are executed in the controller controlling the machine,
- the observer unit is configured to observe and to copy the machine commands and the supervision data transmitted between the controller and the user interface,
- the logging unit is configured to store the machine commands and the supervision data,
- the inference unit is configured to generate a behavior tree program derived from the stored machine commands and supervision data by statistical inference, and to send the generated behavior tree program at the controller unit to operate the machine.

According to an embodiment of the invention, the user interface comprises a graphical user interface configured to display the supervision data, a suggestion or a recommendation to the user and/or input the sequence of machine commands or feedback to the suggestion and/or recommendations by the user.

This provides a flexible communication between the user and the controller.

According to an embodiment of the invention, the logging unit is configured as a knowledge base.

The knowledge base is a technology used to store complex structured and unstructured information used by a computer system providing an expert system. A knowledge base represents facts and ways of reasoning about those facts to deduce new facts or highlight inconsistencies. The knowledge base is structured as a knowledge graph.

According to a third aspect, a computer program product (non-transitory computer readable storage medium having instructions, which when executed by a processor, perform actions) directly loadable into the internal memory of a digital computer is proposed, comprising software code portions when said product is run on said digital computer.

BRIEF DESCRIPTION

Figure 2:
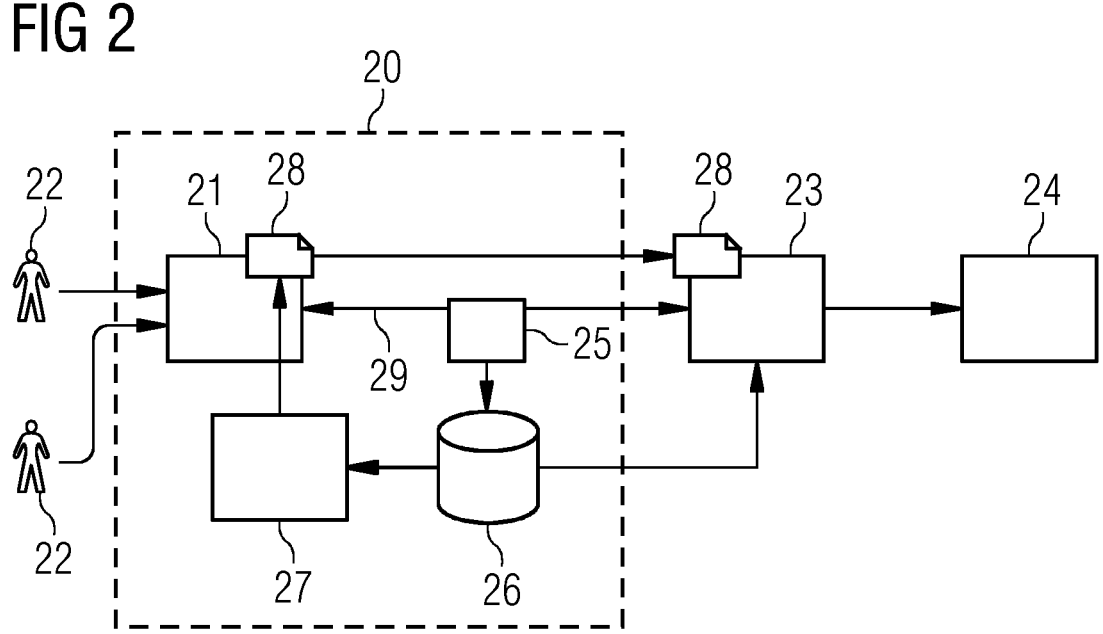
Figure 3:
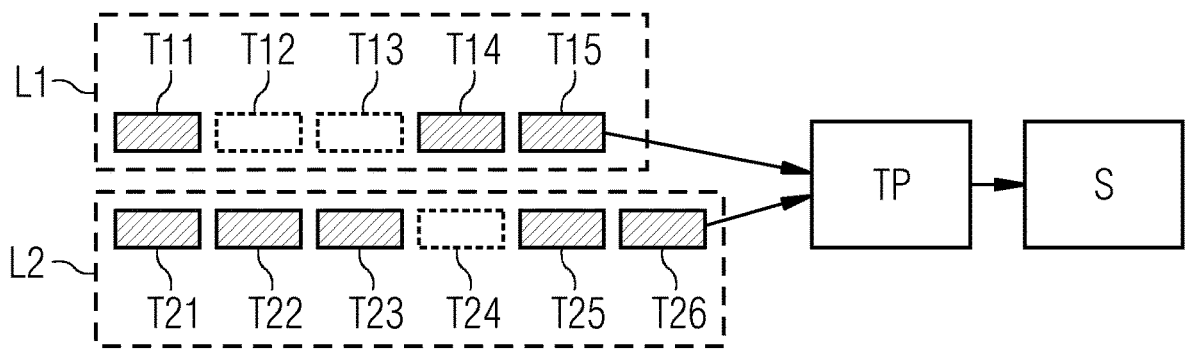
Figure 4A:
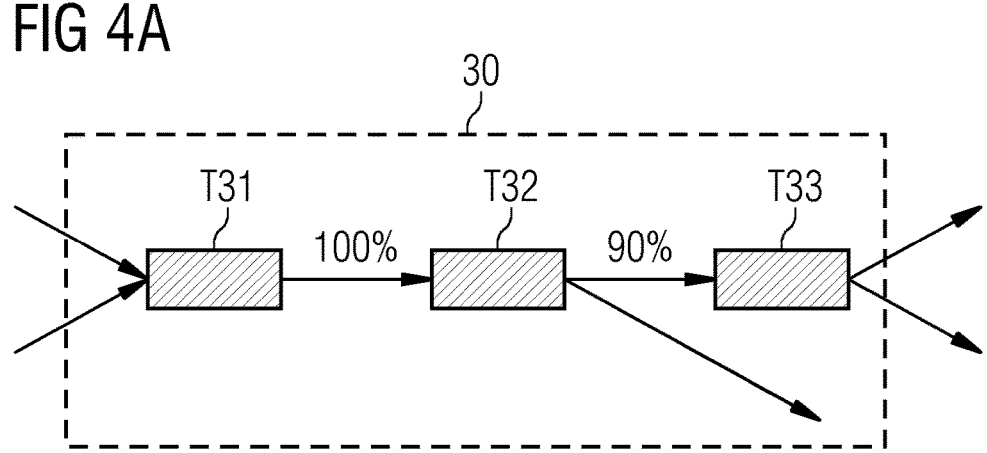
Figure 4B:
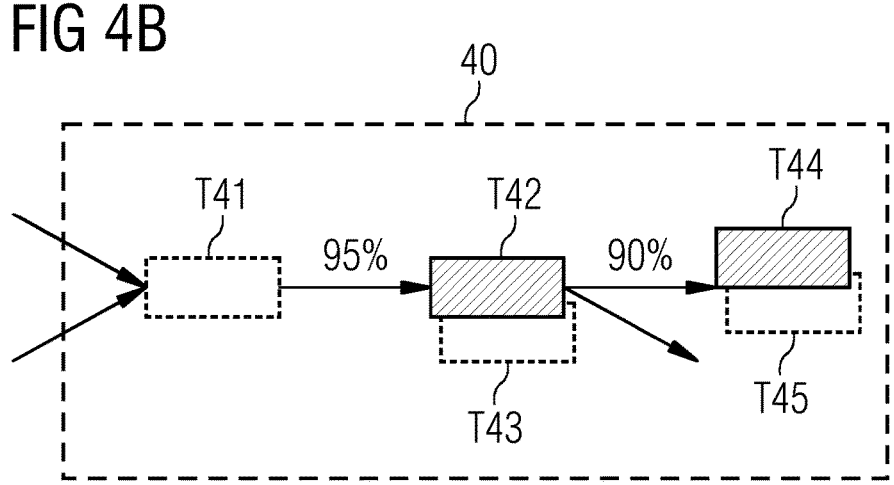
Figure 5A:
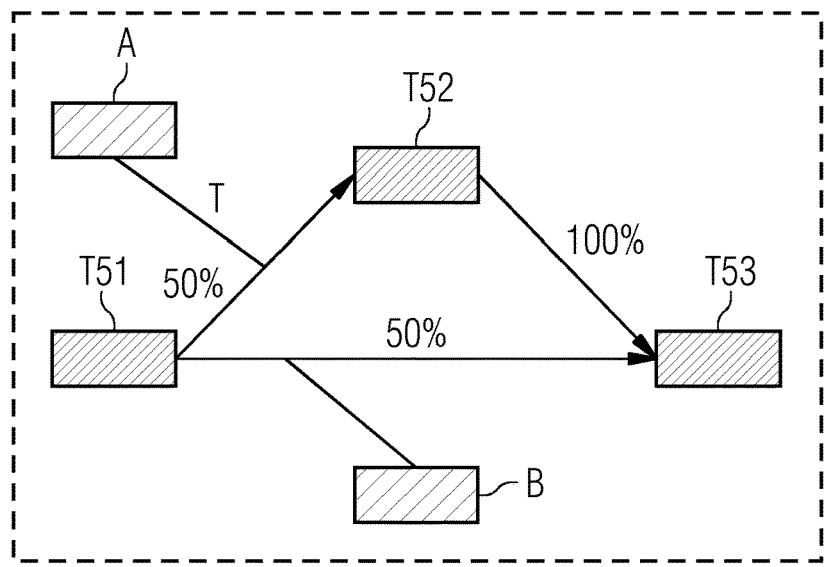
Figure 5B:
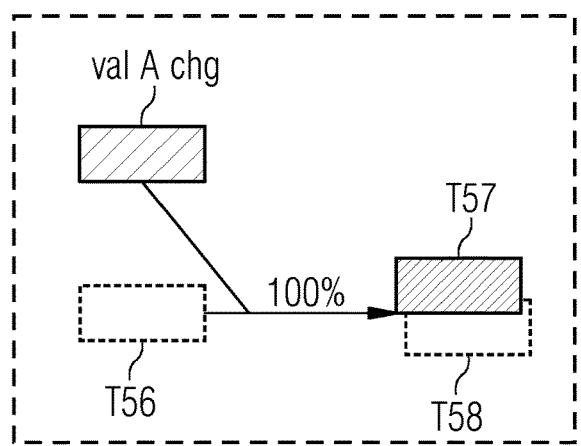
Figure 5C:
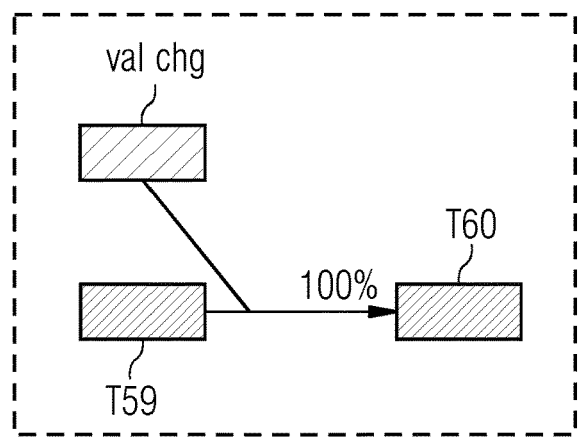
Figure 6:
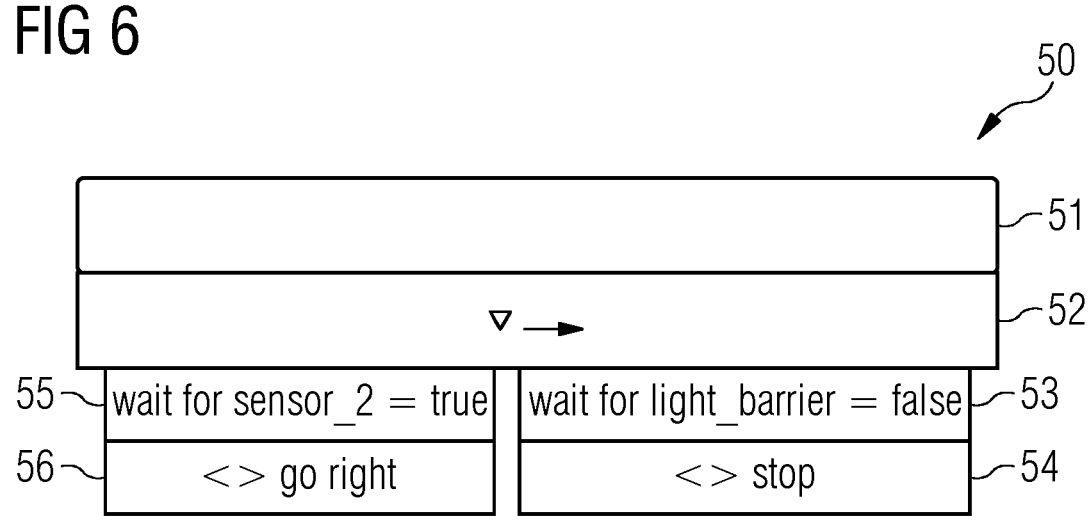
Figure 7:
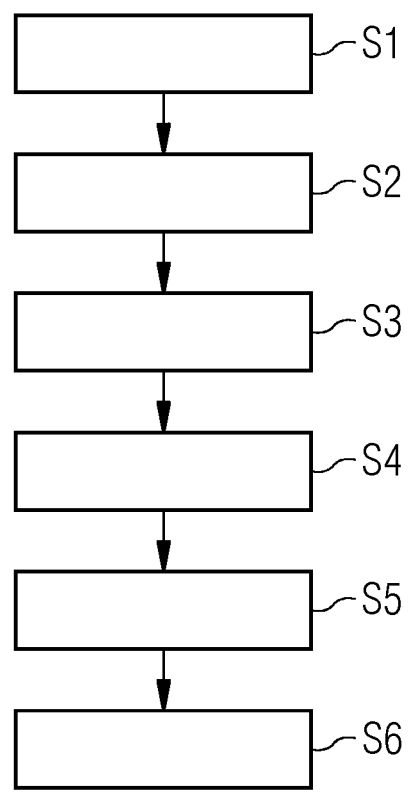

Some of the embodiments will be described in detail, with reference to the following figures, wherein like designations denote like members, wherein:

FIG. 1 schematically illustrates a classical programming system for programming a machine according to an embodiment of the present disclosure;

FIG. 2 schematically illustrates an assistance system generating a behavior tree for controlling a machine according to an embodiment of the present disclosure;

FIG. 3 schematically illustrates inferring of structure elements of a of behavior tree according to an embodiment of the present disclosure;

FIG. 4A schematically illustrates a fallback composite of tasks;

FIG. 4B schematically illustrates inferring a composite of a of behavior tree according to an embodiment of the present disclosure;

FIG. 5A schematically illustrates inferring a decorator of a of behavior tree according to an embodiment of the present disclosure;

FIG. 5B schematically illustrates another sequence of tasks;

FIG. 5C schematically illustrates another sequence of tasks;

FIG. 6 schematically illustrates a generated behavior tree program according to an embodiment of the present disclosure; and FIG. 7 shows a flowchart for schematically illustrating a method according to an embodiment of the present disclosure.

DETAILED DESCRIPTION

It is noted that in the following detailed description of embodiments the accompanying drawings are only schematic and that the illustrated elements are not necessarily shown to scale. Rather, the drawings are intended to illustrate functions and cooperation of components. Here, it is to be understood that any connection or coupling of functional blocks, devices, components, or other physical or functional elements could also be implemented by an indirect connection or coupling, e.g., via one or more intermediate elements. A connection or coupling of elements or components can for example be implemented by a wire-based, a wireless connection, and/or a combination of a wire-based and a wireless connection. Functional blocks can be implemented by dedicated hardware, by firmware and/or software installed on programmable hardware, and/or by a combination of dedicated hardware and firmware or software.

FIG. 1 schematically illustrates a programming system 10 for programming a machine 14, e.g., in classical automation industry.

The programming system comprises an operating interface 11, a programming interface 12 automation, a controller 13 and a machine 14. The machine 14 can be any kind of machine in manufacturing, e.g., automation cells, factory cells, production lines, process lines, assembly lines, or autonomous guided vehicles, short AGVs, Robots, and further.

The programming interface 12 is the interface between a user 16, e.g., an automation engineer and the controller 13.

The automation engineer uses the programming interface 12 to define an automation program 15. The automation program 15 can be structured according to any kind of programming language which is able to control a machine. Examples for programming languages structured text programming languages of the IEC 61131 standard for programmable logic controller, short PLC, like Step 7 comprising contact plan KOP, function plan FUB and Graph 7. The programming interface 12 transmits the automation program 15 to the controller 13. The automation program 15 is executed on the controller 13. The controller 13 can be an automation system, a personal computer, an edge device, a PLC or any other kind of logical machine. During operation of the machine, the user 16, e.g., a machine operator uses the operating interface 11 to monitor and control the machine 14.

FIG. 2 illustrates an assistance system 20 generating a behavior tree program 28 for controlling a machine 24 according to an embodiment of the present disclosure. The machine 24 can be any kind of machine in manufacturing, e.g., automation cells, factory cells, production lines, process lines, assembly lines, or autonomous guided vehicles, short AGVs, Robots, and further, like machine 14. The controller unit 23 controls the machine 24 by executing the behavior tree program 28. The assistance system 20 assists in generating a behavior tree program for a machine 24, comprising a programming interface 21, an observer unit 25, a logging unit 26 and an inference unit 27.

The user interface 21 is the interface between a user 22, e.g., a machine operator or an automation engineer and the controller unit 23. The user interface 21 is configured as a Graphical User interface, a display, a keyboard, a mouse, control units, and the like. The user interface 21 is configured to receive input from a user in a role as machine operator, i.e., entering machine commands during operation of the machine. During a training phase of the assistance system 20, especially of the inference unit 27, the user 22 controls the machine 24 by entering machine commands into the user interface 21. Machine commands, especially high-level machine commands, define a production step, a transportation step, a material flow, material handling, material processing, assembly steps, and so on.

The user 22 uses the user interface 21 to monitor and control the machine. To control the machine, e.g., a conveyor belt, the user enters a first machine commands which, when executed at the controller, instructs the machine to put a block on the conveyor belt. By a second machine command the user 22 starts the conveyor belt. By a third machine command the user 22 stops the conveyor belt when the block hits a light Barrier.

The observer unit 25 intercepts the communication on a communication connection 29 between the user interface 21 and controller unit 23. The observer unit 25 collects all user machine commands entered to the user interface 21, which are intended for the controller unit 23. The observer unit 25 is a support tool to understand the user intention. The observer unit 25 collects the interaction of the user 22 and the feedback, i.e., supervision data from the machine or from components of the machine, e.g., sensors and light barrier of a machine configured as a conveyor belt with several activities being performed while transporting an object.

The logging unit 26 stores the communication, i.e., machine commands and supervision data observed and copied on the connection between user interface 21 and controller unit 23. The logging unit 26 can be a database, a list, a file, a knowledge graph, a knowledge base, or similar. The logging unit 26 is the central storage system and contains all relevant information which the user 22 enters to the user interface 21 to derive the automation program for the controller unit 23.

The inference unit 27 derives the behavior tree from the information in the logging unit 26. The inference unit 27 derives at least one task of the behavior tree from at least one machine command. Tasks in the behavior tree typically correspond to machine commands. The inference unit 27 comprises a statistical inference functionality, also called statistical inference engine, that learns from the stored machine commands and supervision data, which tasks are typically executed in parallel or in sequence, what are usual parameter settings for tasks under which conditions, which tasks usually follow certain other tasks, events, e.g., proximity alert, or conditions, e.g., light barrier interrupted? Methods applied for statistical inference can be, e.g., association rule mining, the apriori algorithm, or methods for sequential pattern mining.

In doing so, preconditions, fallback scenarios, as well as typical sequences of tasks can be learned and tasks, composites providing a logical interconnection of several tasks, like a sequence composite or a fallback composite. The inference unit 27 sends suggestions to the user interface 21 to assist the user 22 to automate operations.

An example for statistical inference performed in inference unit 27 is shown in FIG. 3. The assistance system 20 observes and stores two log files L1, L2 containing a sequence of machine commands that have been executed. Based on the machine commands tasks T11, . . . , T15, T21, . . . , T26 are derived. The Log files L1, L2 further comprise the success status and the state of variables for each task T11, . . . , T15, T21, . . . , T26. In FIG. 3, tasks T11, T14, T15, T21-T23, T25, T26 have finished successfully, tasks T12, T13, T24 have failed. Based on this information transition probabilities TP for success and failure are inferred by the inference unit 27. The inference unit 27 can now provide suggestions S for sequence composites and fallback composites to the user 22, who can confirm or reject those suggestions.

FIG. 4A shows a sequence 30 of tasks T31, . . . , T33. The tasks are performed with high transition probabilities, see values indicated above the arrows between two tasks. The sequence 30 of tasks T31, . . . , T33 is a candidate for being inferred as a sequence composite in case of successful task execution.

Tasks that follow with high probability on a failed task are a candidate for a fallback composite. FIG. 4B shows such a fallback composite 40 of tasks T41, . . . , T45. Task 42, which is a successfully executed task, follows task T41 with a high transition probability.

The identification of decorators can also be supported by analysis of the log files. Decorators are attached to either a composite or a task and define whether a branch in the behavior tree, or even a single node, can be executed. The Decorator can also modify the success or failure status of the decorated task or composite.

In FIG. 5A, Task T51 is followed by Task T52 or by Task T53. The probability for a sequence of tasks T51-T52-T53 correlates with the values of variable A, the probability for the sequence T51-T53 correlates with the value of variable B. That means that variable A and B are candidates for an "if" decorator.

Candidates for a "guard" decorator can be identified by inferring whether the value of a specific variable changes for failed tasks. In the example in FIG. 5B the task T56 fails, and the value of variable A has changed. Variable A is a candidate for a "guard" decorator.

Candidates for a "Wait" decorator can be identified by observation if the value of a specific variable changes at the same time as a new task starts. The example in FIG. 5C shows a value change of a variable A correlating with a transition between tasks T54 and T55.

FIG. 6 shows a behavior tree program 50 generated automatically by the assistance system 20. The behavior tree 50 controlling the system to move to a light barrier, see 51. The behavior tree component 52 represents a "sequence" composite. Behavior tree component 53 represents "wait for light-barrier=false", behavior tree component 54 represents "< > stop", component 55 represents "wait for sensor_2=true and component 56 represents "< > go right. The generated program learnt that:

sensor_2 triggers the start of the conveyor belt (wait for value change of sensor 2)

light barrier stops the conveyor belt (wait for value change of light barrier).

The inference unit 27 can comprise a semantic model, which provides domain knowledge. As an example, it provides the information "task can only be executed with a certain security level, picking of a robot arm is only successful in 90% of the cases and consequently "fallback" is necessary. The semantic model can provide information about tasks that can fail, and which fallback solutions are possible. The inference unit 27 can make recommendations to the user 22 based on assumptions. The user 22 can verify or correct the assumptions. Whenever the inference unit 27 is unsure about something when creating the behavior tree program, user input can be requested, e.g., parallel tasks, fallbacks, preconditions, wait conditions, loops, if-else-statements, stop conditions.

An example question to user is "We noticed that task A is typically executed after the light barrier is interrupted. Do you want to save this as a precondition?"

The assistance system 20 is configured to perform a computer implemented method for automatically generating a behavior tree program for controlling a machine 24 as shown schematically in FIG. 7.

In a first step S1 a sequence of machine commands input by the user 22 at the user interface 21 are transmitted to the controller unit 23. While the machine commands are executed in the controller unit 23 supervision data are received, see step S2, in the user interface 21 from the controller unit 23. The machine commands and supervision data are transferred on a communication connection between the user interface 21 and the controller unit 23, e.g., via a protocol messages according to OPV UA, Profinet and the like. A Machine command activates a machine behavior, a functionality, or an operational state in the machine 24. Supervision data comprises status information and/or sensor data of the machine when controlled by the controller executing the machine commands.

The machine commands and supervision data are observed and copied at the communication connection between the controller 23 and the user interface 21, see step S3. Subsequently in step S4, the machine commands and the supervision data are stored in the logging unit 26.

In step S5, a behavior tree program is derived from the stored machine commands and the supervision data by machine learning, especially by statistical interference. A least one task of the behavior tree is derived from at least one machine command at the inference unit 27. The structure and the components, i.e., composites and decorators of the behavior tree are inferred by analysing, which of the derived tasks are executed in which temporal relation to each other, the return value of the supervision data, the parameter settings for the task with respect to the execution of the task, the co-occurrence of supervision data values and changes of supervision data value with task execution, task cancellations and task parametrizations. the inference unit 27 provides suggestions for further machine commands to the user interface 21 to be entered by the user.

The inference unit 27 provides suggestions for further machine commands to the user interface 21, which can in return be accepted and entered by the user. The suggestions can also be ignored and/or different machine commands or behavior task structure elements, i.e., tasks, composites or decorators can be entered. The inference unit 27 provides a recommendation for a behavior tree structure element to the user interface 21 based on an assumption with respect to a further intended machine operation for verification or modification of the recommendation. Finally, the generated behavior tree program is sent to the controller unit 23 to control the machine 24, see step S6.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer implemented method for automatically generating a behavior tree program for controlling a machine, the method comprising the steps of:
    transmitting a sequence of machine commands input by a user from a user interface to a controller,
    receiving supervision data in the user interface from the controller while the machine commands are executed in the controller controlling the machine,
    observing and copying the machine commands and supervision data transmitted between the controller and the user interface,
    storing the machine commands and the supervision data in a logging unit,
    generating a behavior tree program derived from the stored machine commands and the supervision data by statistical inference, and
    sending the generated behavior tree program to the controller unit to control the machine.

2. The computer implemented method according to claim 1, wherein the machine command activates a machine behavior, a functionality or an operational state in the machine.

3. The computer implemented method according to claim 1, wherein the supervision data comprises status information and/or sensor data of the machine when controlled by the controller executing the machine commands.

4. The computer implemented method according to claim 1, wherein at least one task of the behavior tree program is derived from at least one machine command at an inference unit.

5. The computer implemented method according to claim 4, wherein the structure of the behavior tree program is inferred by analyzing
    which of the derived tasks are executed in which temporal relation to each other,
    the return value of the supervision data,
    the parameter settings for the task with respect to the execution of the task,
    the co-occurrence of supervision data values and changes of supervision data value with task execution, task cancellations and task parametrizations.

6. The computer implemented method according to claim 5, wherein a composite, combining several tasks of the behavior tree program, is inferred by analyzing a sequence of successfully performed tasks and failed tasks and a transition probability for each pair of tasks in the sequence.

7. The computer implemented method according to claim 4, wherein the inference unit provides suggestions for further machine commands to the user interface to be entered by the user.

8. The computer implemented method according to claim 4, wherein the inference unit provides a suggestion for a further behavior tree structure element to the user interface to be entered by the user.

9. The computer implemented method according to claim 1, wherein the inference unit comprises a semantic model providing domain knowledge on at least one of a sequence of tasks, conditions of the tasks and a transition probability for each pair of tasks in the sequence related to a specific machine operation scenario.

10. The computer implemented method according to claim 1, wherein the inference unit provides a recommendation for a behavior tree structure element to the user interface based on an assumption with respect to a further intended machine operation for verification or modification of the recommendation.

11. The computer implemented method according to claim 1, wherein the generated behavior tree program is provided from an inference unit to the controller for controlling the machine.

12. An assistance system for assisted generating a behavior tree program for a machine, comprising a programming interface, an observer unit, a logging unit and an inference unit, wherein
    the interface unit is configured to transmit a sequence of machine commands input by a user from the user interface to a controller, and to receive supervision data from the controller while the machine commands are executed in the controller controlling the machine,
    the observer unit is configured to observe and to copy the machine commands and the supervision data transmitted between the controller and the user interface,
    the logging unit is configured to store the machine commands and the supervision data, and
    the inference unit is configured to generate a behavior tree program derived from the stored machine commands and supervision data by statistical inference, and to send the generated behavior tree program at the controller unit to operate the machine.

13. The assistance system according to claim 12, wherein the user interface comprises a graphical user interface configured to display the supervision data, a suggestion or a recommendation to the user.

14. The assistance system according to claim 13, wherein the graphical user interface is configured to input user feedback to the suggestion and/or recommendation.

15. The assistance system according to claim 12, wherein the logging unit is configured as a knowledge graph or a knowledge base.

16. The assistance system according to claim 12, wherein the user interface comprises a graphical user interface configured to input the sequence of machine commands.

17. A computer program product, comprising a non-transitory computer readable hardware storage device having computer readable program code stored therein, said program code executable by a processor of a computer system to implement a method directly loadable into the internal memory of a digital computer, comprising software code portions for performing the steps according to claim 1 when the product is run on the digital computer.

\* \* \* \* \*